United States Patent

[11] 3,578,939

| [72] | Inventor | Randolph E. Green<br>8 Woodbine St., Roxbury, Mass. 02119 |
|---|---|---|
| [21] | Appl. No. | 768,200 |
| [22] | Filed | Oct. 15, 1968 |
| [45] | Patented | May 18, 1971 |

[54] BACKING GAS ATTACHMENT SAVING DEVICE FOR HELIARC WELDING
4 Claims, 1 Drawing Fig.

| [52] | U.S. Cl. | 219/74, 219/72 |
|---|---|---|
| [51] | Int. Cl. | B23k 9/16 |
| [50] | Field of Search | 219/74, 72 |

[56] References Cited
UNITED STATES PATENTS

| 2,747,065 | 5/1956 | Diehl | 219/74 |
|---|---|---|---|
| 2,852,660 | 9/1958 | Maloney | 219/74 |
| 2,804,885 | 9/1957 | Mott | 219/74 |
| 3,042,791 | 7/1962 | Reeh | 219/75 |

*Primary Examiner*—J. V. Truhe
*Assistant Examiner*—L. H. Bender
*Attorney*—Cesari and McKenna

ABSTRACT: A backing gas attachment for conserving backing gas during heliarc welding provides simultaneous control of the flow of cover gas and backing gas to a piece being welded. This prevents waste of the backing gas when its use is not required.

Patented May 18, 1971 3,578,939
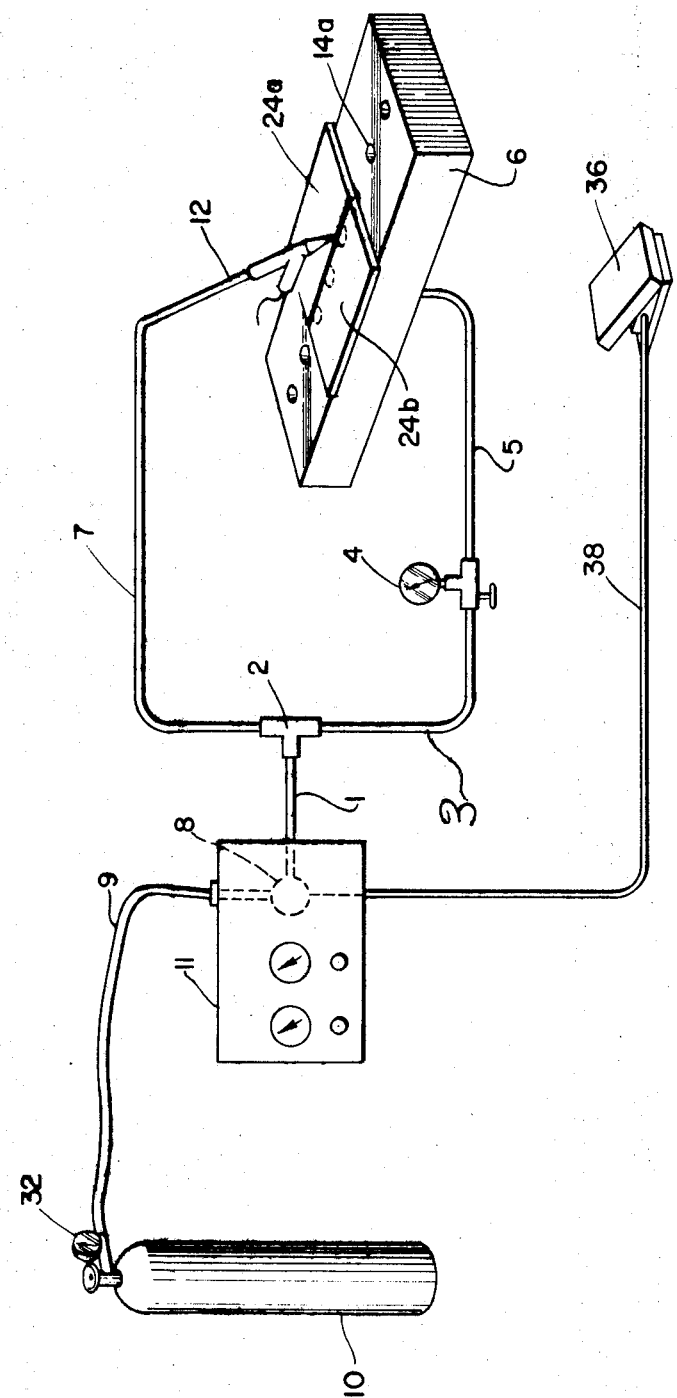
INVENTOR.
RANDOLPH E. GREEN 3,578,939

BACKING GAS ATTACHMENT SAVING DEVICE FOR HELIARC WELDING

BACKGROUND OF THE INVENTION

1. Field of the Invention

The invention relates to a gas control system for heliarc welding and more particularly to a backing gas attachment for conserving backing gas during heliarc welding.

2. Prior Art

A heliarc-welding system utilizes a spark struck between an electrode and a workpiece to dissociate a gas on passage between the electrode and workpiece; on recombination of the gas at the surface of the workpiece, intense heat is generated which welds one or more portions of the workpiece together. To achieve this, a stream of inert gas is applied to the front face of the workpiece adjacent the welding electrode; this stream is called the cover stream or cover gas. In many cases it is also necessary to provide a stream of gas to the reverse face of the piece being welded; this is called the backing stream or backing gas.

Heretofore the cover gas and the backing gas have been supplied from separate sources or tanks and have been independently regulated. Accordingly, the backing gas supply was required to be turned on and off separately from the cover gas. This resulted in frequent waste of the backing gas since the worker often neglected to turn off this gas during the short intervals that he might be required to be away from the welding task or might even forget about it entirely, thereby totally depleting the supply of backing gas.

BRIEF SUMMARY OF THE INVENTION

A. Objects of the Invention

Accordingly, it is an object of the invention to provide a backing gas attachment for heliarc-welding applications.

Another object of the invention is to provide a backing gas attachment for a heliarc welder which allows simultaneous control of the flow of cover gas and backing gas.

Yet another object of the invention is to provide a backing gas attachment for heliarc welding in which means are provided for simultaneously controlling the flow of cover gas and backing gas while providing separate adjustment of their flow rates.

Still a further object of the invention is to provide a backing gas attachment for a heliarc welder in which both the cover gas and the backing gas may be obtained from the same supply source and may be simultaneously controlled.

The invention accordingly comprises the features of construction, combination of elements, and arrangement of parts which will be exemplified in the construction hereinafter set forth, and the scope of the invention will be indicated in the claims.

B. Brief Description of the Invention

In accordance with the present invention, the undesirable wastage of backing gas is eliminated by the provision of a simple attachment which is connectable to a single supply source for simultaneously controlling the supply of both cover and backing gas to a workpiece.

The attachment comprises an extension line for connection to the outlet port of a main gas valve in a conventional welder unit and a "tee" whose inlet port is connected to the other end of the extension line and whose outlet ports are adapted to be connected to the cover gas line and the backing gas line respectively. A solenoid-operated valve in the main gas supply line which is connected to a single gas supply feeds gas to both lines simultaneously when it is actuated. The valve is operated from a foot-actuated switch in the conventional manner. A flowmeter and regulator in the backing gas supply conduit is also provided to enable the welder to adjust the pressure of the backing gas separately from the pressure of the cover gas.

SPECIFIC DESCRIPTION OF THE INVENTION

The single FIGURE of the drawing shows a preferred embodiment of the present invention. A single tank 10 of gas is connected in the usual manner through a gas line 9 to the inlet port of a main valve 8 in a welding machine 11. The valve 8 is opened and closed from a remote location by a foot pedal 36 through a line 38; when the pedal is depressed, it energizes a solenoid connected to the valve to open the valve 8 and supply gas to the outlet port of the valve. In normal heliarc welding operations, the welding torch is connected directly to the outlet port of the valve 8 through the line 7 and the flow of cover gas is thus controlled by the valve 8. However, the backing gas is obtained from a separate supply and must be separately controlled, thus leading to the problems previously described. In contrast, I obviate this cumbersome and wasteful arrangement by attaching an extension line 1 to the outlet port of the valve 8 and connecting a tee 2 to this extension. The welding gas line 7 is then connected to the upper part of the tee 2 and the backing gas line 5 is connected to the lower part through a flowmeter 4. The flowmeter, in addition to providing an indication of the backing gas flow rate into the line 5, may also be provided with a manually adjustable valve for regulating this flow. The line 5 supplies backing gas to a chamber 6 on which a workpiece to be welded is positioned. As is customary in heliarc welding practice, the chamber 6 has vents in its upper surface against which the rear face of the workpiece is positioned so that backing gas may be supplied to it.

When a welding operation calling for the use of both cover and backing gas is to be undertaken, the welder adjusts the valve on the tank 10 to obtain the desired cover gas pressure. This controls the pressure of the gas in the connector 1 and tee 2 and thus in the cover gas line 7. The welder also adjusts the setting of the flowmeter 4 to obtain the desired backing gas pressure for the chamber 14; this pressure may or may not be the same as the pressure in the line 7.

After the appropriate current and voltage settings are made on the welding machine 30, the welder is ready to begin welding. This is accomplished by bringing the welder electrode adjacent the workpieces to be welded. Simultaneously, the welder depresses the foot pedal 36 to open the valve 8. This admits gas to the connector 1 and thence through the tee 2 into the lines 7 and 5 respectively; the gas then flows to the torch and the chamber 6 respectively.

As long as the foot switch is depressed, the valve 8 thus feeds both cover and backing gas to the workpiece. When the welding pass is completed, the welder releases the pressure on the foot switch. This closes the valve 8 and simultaneously cuts off the further supply of gas to the torch and the chamber, thus insuring that the backing gas is not supplied to the chamber for any length of time greater than necessary to accomplish the desired weld.

As may be seen from the above, the backing gas attachment of the present invention readily adapts the conventional cover gas control system for simultaneous cover gas and backing gas control. It eliminates the need for separate gas sources and prevents unnecessary dissipation of the backing gas when it is not needed. The attachment is readily formed from a short extension line for coupling to the main gas valve outlet port; the extension line terminates in a conventional tee which feeds the gas through separate lines for connection to the welder and to the backing gas chamber respectively. Through use of this attachment, the main gas valve in the conventional welding machine may be used without replacement for simultaneous control of flow of both the cover gas and the backing gas to the workpiece.

In those instances in which the cover gas alone is to be used, the backing gas may, of course, be completely cut off at the flowmeter and valve 4. Thus the present attachment may be placed on all welder units to provide the operator with a choice of cover gas control alone or of simultaneous cover gas and backing gas control.

I claim:

1. In a heliarc-welding system including a main gas valve having an inlet port for connection to a gas supply and an outlet port for connection to a welder, and having means for intermittently and remotely actuating said valve to establish access between said ports to thereby control the supply of cover gas to a workpiece, the improvement which comprises a backing gas attachment for controlling the flow of backing gas to said workpiece simultaneously with the flow of said cover gas, said attachment comprising a junction means having an inlet port for connection to said main gas valve output port and a pair of outlet ports for connection to a cover gas line and to a backing gas line respectively, the cover gas and the backing gas being thereby constrained to flow through the attachment and into their respective lines simultaneously on remote actuation of the main gas valve and being blocked from said lines simultaneously when said valve is not remotely actuated.

2. A backing gas attachment according to claim 1 which includes a gas flow-measuring and controlling means connected to one of the junction means outlet ports for connection in series with the backing gas line to provide separate control of the gas flow through said line.

3. A backing gas attachment according to claim 1 comprising a connecting line for coupling at one end thereof to said main gas valve outlet line and a tee having a pair of outlet ports for connection to said backing gas line and said cover gas line respectively, and having an inlet port for connecting to the other end of said connecting line.

4. A backing gas attachment according to claim 3 in which said main gas valve is connected to a single source of supply whereby the cover gas and the backing gas are supplied for use simultaneously from a single source.